United States Patent

Yamashita et al.

Patent Number: 5,370,731
Date of Patent: Dec. 6, 1994

[54] INK FOR THERMAL INK JET RECORDING

[75] Inventors: Yoshiro Yamashita; Toshitake Yui; Fuminori Koide; Akihiko Chujo; Ken Hashimoto, all of Minami-ashigara, Japan

[73] Assignee: Fuji Xerox Co., Ltd., Tokyo, Japan

[21] Appl. No.: 186,064

[22] Filed: Jan. 25, 1994

[30] Foreign Application Priority Data

Jan. 27, 1993 [JP] Japan .................. 5-029641

[51] Int. Cl.$^5$ .............................. C09D 11/02
[52] U.S. Cl. ................. 106/22 H; 106/20 R; 106/23 H
[58] Field of Search ............... 106/20 R, 22 H, 23 H

[56] References Cited

U.S. PATENT DOCUMENTS

| | | | |
|---|---|---|---|
| 4,308,061 | 12/1981 | Iwahashi et al. | 106/22 H |
| 4,508,570 | 4/1985 | Fujii et al. | 106/20 D |
| 5,129,948 | 7/1992 | Breton et al. | 106/22 H |

FOREIGN PATENT DOCUMENTS

| | | |
|---|---|---|
| 57-209972 | 12/1982 | Japan . |
| 1-149872 | 6/1989 | Japan . |
| 2-233780 | 9/1990 | Japan . |
| 2-233781 | 9/1990 | Japan . |
| 3-48953 | 7/1991 | Japan . |
| 3-160070 | 7/1991 | Japan . |
| 4-277669 | 8/1992 | Japan . |

*Primary Examiner*—Helene Klemanski
*Attorney, Agent, or Firm*—Oliff & Berridge

[57] ABSTRACT

An novel ink for thermal ink jet recording comprising at least water and a coloring material is provided, characterized in that there is contained an amino compound represented by the following general formula (I) or (II):

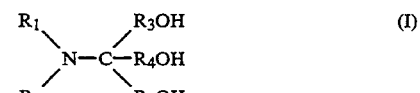

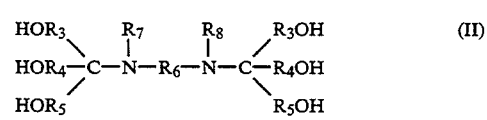

wherein $R_1$ represents a $C_{1-5}$ alkyl group having a hydroxyl group; $R_2$, $R_7$ and $R_8$ may be the same or different and each represents a hydrogen atom or a $C_{1-5}$ alkyl group having a hydroxyl group; $R_3$, $R_4$ and $R_5$ may be the same or different and each represents a $C_{1-3}$ alkylene group; and $R_6$ represents a $C_{1-5}$ alkylene group. The content of said amino compound is in the range of 0.005 to 5.0% by weight.

4 Claims, No Drawings

INK FOR THERMAL INK JET RECORDING

FIELD OF THE INVENTION

The present invention relates to a novel ink for use in thermal ink jet recording apparatus.

BACKGROUND OF THE INVENTION

Extensive studies have been made on a so-called ink jet recording apparatus which provides recording on a paper, cloth, film or the like by discharging a liquid or molten solid ink through a nozzle, slit or porous film taking into account its advantages such as small size, cheapness and low noise. In particular, a printer which can provide a good printing quality on a so-called plain paper such as reporting pad paper and copying paper is commercially available as a black monochromic printer.

An ink for use in thermal ink jet recording apparatus has the following requirements:

(1) causes no corrosion or decomposition of the print head material;

(2) causes no deposition of materials constituting the ink, particularly dyes in the case of a dye-containing ink, when stored for a prolonged period of time;

(3) causes no clogging in the tip of the print head;

(4) causes little scorching on the heater called kogation; and (5) causes no hue unevenness, blank area and disturbance in the practically printed recorded image. In particular, the requirement (4) is an important assignment and has heretofore been extensively studied.

JP-A-3-160070 (the term "JP-A" as used herein means an "unexamined published Japanese patent application") discloses an approach which comprises the addition of an oxo anion. JP-B-3-48953 (the term "JP-B" as used herein means an "examined Japanese patent publication") discloses an approach which comprises limiting the content of metallic impurities. JP-A-4-227669 discloses an approach which comprises the addition of an organic sulfonate to minimize kogation.

Although the foregoing approaches provide some reduction of kogation, none of these approaches can satisfactorily meet all these requirements.

It is therefore an object of the present invention to provide an ink for thermal ink jet recording which minimizes kogation on the heater, causes no corrosion or decomposition of the heat material, exhibits a high coloring material dissolution stability during prolonged storage or use and causes no clogging or emission unevenness.

The foregoing object of the present invention will become more apparent from the following detailed description and examples.

The inventors found that an ink for thermal ink jet recording comprising water and a coloring material as essential components, which contains an amino compound having three hydroxyl groups in one alkyl side chain, minimizes kogation on the heater, causes no corrosion or decomposition of the heat material, exhibits a high coloring material dissolution stability during prolonged storage or use and causes no clogging or jetting unevenness. Thus, the present invention was worked out.

The foregoing object of the present invention is accomplished with an ink for thermal ink jet recording comprising water, a coloring material and an amino compound represented by formula (I) or (II):

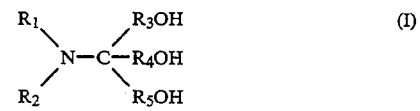

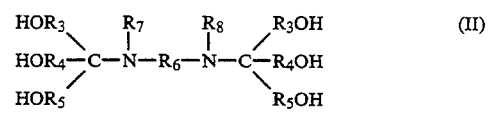

wherein $R_1$ represents a $C_{1-5}$ alkyl group having a hydroxyl group; $R_2$, $R_7$ and $R_8$ may be the same or different and each represents a hydrogen atom or a $C_{1-5}$ alkyl group having a hydroxyl group; $R_3$, $R_4$ and $R_5$ may be the same or different and each represents a $C_{1-3}$ alkylene group; and $R_6$ represents a $C_{1-5}$ alkylene group.

DETAILED DESCRIPTION OF THE INVENTION

The present invention will be further described hereinafter.

As the coloring material to be used in the present invention there may be used various dyes, pigments, colored polymers, colored waxes, etc. Among these coloring materials, water-soluble dyes are preferably used. Such water-soluble dyes may be acidic dyes, direct dyes, basic dyes, reactive dyes or the like. Preferred among these dyes are acidic dyes and direct dyes.

Examples of such dyes include C. I. direct black-2, C. I. direct black-4, C. I. direct black-9, C. I. direct black-11, C. I. direct black-17, C. I. direct black-19, C. I. direct black-22, C. I. direct black-32, C. I. direct black-80, C. I. direct black-151, C. I. direct black-154, C. I. direct black-168, C. I. direct black-171, C. I. direct black-194, C. I. direct blue-1, C. I. direct blue-2, C. I. direct blue-6, C. I. direct blue-8, C. I. direct blue-22, C. I. direct blue-34, C. I. direct blue-70, C. I. direct blue-71, C. I. direct blue-76, C. I. direct blue-78, C. I. direct blue-86, C. I. direct blue-112, C. I. direct blue-142, C. I. direct blue-165, C. I. direct blue-199, C. I. direct blue-200, C. I. direct blue-201, C. I. direct blue-202, C. I. direct blue-203, C. I. direct blue-207, C. I. direct blue-218, C. I. direct blue-236, C. I. direct blue-287, C. I. direct red-1, C. I. direct red-2, C. I. direct red-4, C. I. direct red-8, C. I. direct red-9, C. I. direct red-11, C. I. direct red-13, C. I. direct red-15, C. I. direct red-20, C. I. direct red-28, C. I. direct red-31, C. I. direct red-33, C. I. direct red-37, C. I. direct red-39, C. I. direct red-51, C. I. direct red-59, C. I. direct red-62, C. I. direct red-63, C. I. direct red-73, C. I. direct red-75, C. I. direct red-80, C. I. direct red-81, C. I. direct red-83, C. I. direct red-87, C. I. direct red-90, C. I. direct red-94, C. I. direct red-95, C. I. direct red-99, C. I. direct red-101, C. I. direct red-110, C. I. direct red-189, C. I. direct yellow-1, C. I. direct yellow-2, C. I. direct yellow 4, C. I. direct yellow-8, C. I. direct yellow-11, C. I. direct yellow-12, C. I. direct yellow-26, C. I. direct yellow-27, C. I. direct yellow-28, C. I. direct yellow-33, C. I. direct yellow-34, C. I. direct yellow-41, C. I. direct yellow-44, C. I. direct yellow-48, C. I. direct yellow-58, C. I. direct yellow-86, C. I. direct yellow-87, C. I. direct yellow-88, C. I. direct yellow-135, C. I. direct yellow-142, C. I. direct yellow-144, C. I. food black-1, C. I. food black-2, C. I. acid black-1, C. I. acid black-2, C. I. acid black-7, C. I. acid black-16, C. I. acid black-24, C. I. acid black- 26, C. I. acid black-28, C. I. acid black-31, C. I. acid black-48, C. I. acid black-52, C. I. acid black-63, C. I. acid black-107, C. I. acid black-112, C. I. acid black-118, C. I. acid black-119, C. I. acid black-121, C. I. acid black-156, C. I. acid black-172, C. I. acid black-194, C. I. acid black-208, C. I. acid blue-1, C. I. acid blue-7, C. I. acid blue-9, C. I. acid blue-15, C. I. acid blue-22, C. I. acid blue-23, C. I. acid blue-27, C. I. acid blue-29, C. I. acid blue-40, C. I. acid blue-43, C. I. acid blue-55, C. I. acid blue-59, C. I. acid blue-62, C. I. acid blue-78, C. I. acid blue-80, C. I. acid blue-81, C. I. acid blue-83, C. I. acid blue-90, C. I. acid blue-102, C. I. acid blue-104, C. I. acid blue-111, C. I. acid blue-185, C. I. acid blue-249, C. I. acid blue-254, C. I. acid red-1, C. I. acid red-4, C. I. acid red-8, C. I. acid red-13, C. I. acid red-14, C. I. acid red-15, C. I. acid red-18, C. I. acid red-21, C. I. acid red-26, C. I. acid red-35, C. I. acid red-37, C. I. acid red-110, C. I. acid red-144, C. I. acid red-180, C. I. acid red-249, C. I. acid red-257, C. I. acid yellow-1, C. I. acid yellow-3, C. I. acid yellow-4, C. I. acid yellow-7, C. I. acid yellow-11, C. I. acid yellow-12, C. I. acid yellow-13, C. I. acid yellow-14, C. I. acid yellow-18, C. I. acid yellow-19, C. I. acid yellow-23, C. I. acid yellow-25, C. I. acid yellow-34, C. I. acid yellow-38, C. I. acid yellow-41, C. I. acid yellow-44, C. I. acid yellow-53, C. I. acid yellow-55, C. I. acid yellow-61, C. I. acid yellow-71, C. I. acid yellow-76, C. I. acid yellow-78, C. I. acid yellow-79, and C. I. acid yellow-122.

These dyes may be used singly or in admixture. Toning may be effected to give four primaries, i.e., cyan, magenta, yellow and black as well as custom colors such as red, blue and green.

Examples of pigments which can be used in the present invention include carbon black, brilliant carmine BS, lake carmine FB, brilliant fast scarlet, disazo yellow, permanent red R, fast yellow 10G, phthalocyanine blue, blue lake, yellow lake, and rhodamine lake.

The content of such a coloring material is in the range of 0.3 to 15% by weight, preferably 0.3 to 10% by weight, more preferably 1 to 10% by weight, most preferably 1 to 8% weight based on the total weight of ink.

The ink according to the present invention normally comprises a water-soluble organic solvent together with water and a coloring material. Examples of such a water-soluble organic solvent include polyvalent alcohols such as ethylene glycol, diethylene glycol, triethylene glycol, polyethylene glycol, propylene glycol, glycerin and thiodiglycol, glycol ethers such as ehtylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether and propylene glycol monobutyl ether, basic solvents such as pyrrolidone, N-methyl-2-pyrrolidone and triethanolamine, alcohols such as ethyl alcohol, isopropyl alcohol, butyl alcohol and benzyl alcohol, dimethyl sulfoxide, and sulforan. These solvents may be used singly or in admixture.

If the content of such a water-soluble organic solvent is too large, the ink viscosity is increased, deteriorating the emission stability. Therefore, the content of the water-soluble organic solvent is workably in the range of about 1 to 60% by weight, preferably about 5 to 40% by weight, more preferably 10 to 40% by weight, most preferably 10 to 30% by weight based on the total weight of ink.

The amino compound to be used as a kogation reducer is a polyolamine compound containing an alkyl group having three hydroxyl groups connected to a nitrogen atom and containing three or more hydroxyl groups per molecule as represented by formula (I) or (II).

In formula (I) or (II), the hydroxyl-containing $C_{1-5}$ alkyl group represented by $R_1$, $R_2$, $R_7$ or $R_8$ may be an alkyl group containing a plurality of hydroxyl groups. Examples of such an alkyl group include methylol group, 1-hydroxyethyl group, 2-hydroxyethyl group, 1-hydroxypropyl group, 2-hydroxypropyl group, 3-hydroxypropyl group, 2-hydroxy-i-propyl group, dimethylolmethyl group, α-glyceryl group, β-glyceryl group, 2-hydroxy-n-butyl group, 4-hydroxybutyl group, monohydroxy-t-butyl group, 1,2-dimethylolethyl group, 2,2-dimethylolethyl group, trimethylolmethy group, 5-hydroxypentyl group, trimethylolethyl group, and dimethylolpropyl group. Preferred examples of the alkyl moiety in $R_1$, $R_2$, $R_7$ and $R_8$ include an ethyl, a methyl and a propyl (that is, groups having 1 to 3 carbon atoms). Of them, methyl is most preferred.

Examples of the $C_{1-3}$ alkylene group represented by $R_3$, $R_4$ or $R_5$ include methylene group, ethylene group, ethylidene group, trimethylene group, and propylene group (e.g., i-propylene group), preferably methylene group, ethylene group and propylene group, more preferably methylene group.

The $C_{1-5}$ alkylene group represented by $R_6$ include methylene group, ethylene group, trimethylene group, propylene group (e.g., i-propylene group), tetramethylene group, and pentamethylene group, preferably methylene group, ethylene group, and propylene group.

Typical examples of these amino compounds will be tabulated below.

TABLE 1

| No. | Structure | Compound name | pKa |
|---|---|---|---|
| 1 | CH₂—NH—C(CH₂OH)₃ <br> │ <br> CH₂ <br> │ <br> CH₂—NH—C(CH₂OH)₃ | N,N'-bis-trimethylol-methylpropylene-diamine | 6.80 |
| 2 | (HOCH₂CH₂)₂N—C(CH₂OH)₃ | N-(trimethylol-methyl)diethanol-amine | 6.46 |
| 3 | HOCH₂CH₂—HN—C(CH₂OH)₃ | N-(trimethylol-methyl)ethanol-amine | 7.83 |

Even if such an amino compound is used singly, the desired effect can be sufficiently exerted. In order to further assure the buffer action, such an amino compound is preferably used in combination with an acid such as hydrochloric acid, sulfuric acid, nitric acid and acetic acid. In this case, when an acid is added to the amino compound in an amount of half the neutralization equivalent, a pH value equal to pKa is indicated.

The pKa value of the amino compound is in the range of 6.00 to 8.00.

The content of the amino compound in the total amount of the ink is preferably in the range of about 0.005 to 0.1 mol/dm$^3$ or 0.005 to 5% by weight, more preferably 0.01 to 3% by weight, most preferably 0.5 to 2% by weight, though depending on the molecular amount of the amino compound.

In order to expedite the drying of the ink of the present invention, a penetrating agent for accelerating the penetration into a paper or a so-called surface active agent for stabilizing the dissolution or dispersion of a dye or pigment may be added thereto. As such a surface active agent there may be used any of nonionic, anionic, cationic and amphoteric surface active agents.

The content of the surface active agent in the total amount of the ink may be in the range of 0.005 to 3% by weight.

Examples of nonionic surface active agents include polyoxyethylene nonylphenyl ether, polyoxyethylene octylphenyl ether, polyoxyethylene dodecylphenyl ether, polyoxyethylene alkyl ether, polyoxyethylene polyoxypropylene block copolymer, aliphatic ester of polyoxyethylene, aliphatic ester of sorbitan, aliphatic ester of polyoxyethylenesorbitan, and aliphatic alkylolamide. Examples of anionic surface active agents include alkylbenzenesulfonate, alkylnaphthalenesulfonate, formalin condensate of naphthalenesulfonate, higher aliphatic acid salt, sulfuric ester salt of higher aliphatic ester, sulfonate of higher aliphatic ester, sulfuric ester salt and sulfonate of higher alcohol ether, alkylcarbonate of higher alkylsulfonamide, and ester salt of sulfosuccinic acid. Examples of cationic surface active agents include primary, secondary and tertiary amine salts, and quaternary ammonium salt. Examples of amphoteric surface active agents include betaine, sulfobetaine, and sulfate betaine.

Further, as a solubilizing agent there may be used urea, acetamide or the like. As a physical property adjustor there may be used an inclusion compound such as polyethyleneimine, polyamine, polyvinylpyrrolidone, polyethylene glycol, cellulose derivative, cyclodextrin, macrocyclic amine and crown ether. If necessary, a mildew-proofing agent, electrically conducting agent, etc. may be incorporated in the ink.

Water is used as a remainder in the present invention.

The ink for thermal ink jet recording having the foregoing composition can successfully provide printing for a prolonged period of time after continuous emission without causing any significant kogation and any head fault.

The mechanism in which the ink of the present invention can successfully provide printing is not always obvious. For example, the following mechanisms can be thought.

(1) Probably due to its structure, the amino compound according to the present invention inhibits the agglomeration of coloring material grains by a mutual interaction with nitrogen substituents or hydroxyl groups present in the coloring material structure in the ink. Thus, the amino compound according to the present invention is effective for the minimization of kogation.

(2) Since the amino compound according to the present invention is weakly basic itself and has a somewhat large molecular amount, it exhibits a low corrosiveness, making it difficult for the ink to decompose or corrode the head material.

(3) Since the micelle and agglomerated state of the coloring material don't change and the dissolution stability of the coloring materials is not deteriorated during storage or use, clogging and emission unevenness can be effectively inhibited.

(4) The amino compound according to the present invention can hardly form a complex with materials present in the ink, particularly a polyvalent metallic cation contained in the coloring material, causing no production of insoluble matters which cause clogging.

(5) Taking an amino compound represented by formula (I) as an example, the amino compound according to the present invention is equilibrated as represented by the following formula and provides a stable pH value:

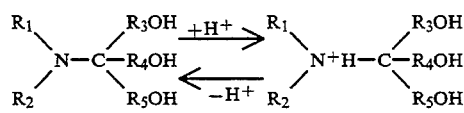

wherein $R_1$, $R_2$, $R_3$, $R_4$ and $R_5$ are as defined above.

The present invention will be further described in the following examples and comparative examples, but the present invention should not be construed as being limited thereto.

EXAMPLE 1

| | |
|---|---|
| C. I. direct yellow 86 | 2 parts by weight |
| Diethylene glycol | 15 parts by weight |
| Compound No. 1 as set forth in Table 1 | 0.9 part by weight |
| Hydrochloric acid | 0.05 part by weight |
| Pure water | 80 parts by weight |

The foregoing components were thoroughly mixed to make a solution which was then pressure-filtered through a 0.45-μm pore filter to prepare an ink. The ink thus prepared exhibited a viscosity of 1.7 cP and a surface tension of 55 dyn/cm.

COMPARATIVE EXAMPLE 1

| | |
|---|---|
| C. I. direct yellow 86 | 2 parts by weight |
| Diethylene glycol | 15 parts by weight |
| Pure water | 80 parts by weight |

COMPARATIVE EXAMPLE 2

| | |
|---|---|
| C. I. direct yellow 86 | 2 parts by weight |
| Diethylene glycol | 15 parts by weight |
| Sodium methanesulfonate | 0.6 part by weight |
| Pure water | 80 parts by weight |

The foregoing components were mixed and filtered in the same manner as in Example 1 to prepare inks. Each inks of Comparative Examples 1 and 2 exhibited a viscosity of 1.7 cP and a surface tension of 55 dyn/cm.

EXAMPLE 2

| | |
|---|---|
| C. I. direct black 154 | 3 parts by weight |
| Ethylene glycol | 10 parts by weight |
| Diethylene glycol monobutyl ether | 10 parts by weight |
| Compound No. 2 as set forth in Table 1 | 0.6 part by weight |
| Sulfuric acid | 0.1 part by weight |
| Pure water | 80 parts by weight |

EXAMPLE 3

| | |
|---|---|
| C. I. direct black 154 | 3 parts by weight |
| Ethylene glycol | 10 parts by weight |
| Diethylene glycol monobutyl ether | 10 parts by weight |
| Compound No. 3 as set forth in Table 1 | 0.1 part by weight |
| Pure water | 80 parts by weight |

The foregoing components were mixed and filtered in the same manner as in Example 1 to prepare inks. Each inks of Examples 2 and 3 exhibited a viscosity of 2.3 cP and a surface tension of 36 dyn/cm.

COMPARATIVE EXAMPLES 3

| | |
|---|---|
| C. I. direct black 154 | 3 parts by weight |
| Ethylene glycol | 10 parts by weight |
| Diethylene glycol monobutyl ether | 10 parts by weight |
| Potassium dihydrogenphosphate | 0.2 part by weight |
| Sodium dihydrogenphosphate | 0.2 part by weight |
| Pure water | 80 parts by weight |

The foregoing components were mixed and filtered in the same manner as in Example 1 to prepare an ink.

The ink thus prepared exhibited a viscosity of 2.3 cP and a surface tension of 36 dyn/cm.

Evaluation of Ink

These inks were then evaluated for the following properties. The surface tension 3) and the viscosity 4) of these inks were already described.

1) Initial pH

The pH value was measured by means of a pH meter (available from Horiba Seisakusho K.K.) in an atomsphere of 20° C. and 50% RH.

2) pH after storage at ordinary temperature 100 ml of the ink was sealed in a 1l-polyethylene bottle, stored at a temperature of 20° C. for 1 month, and then measured for pH.

3) Surface tension

The surface tension was measured by means of a Wilhelmy type surface tension meter in an atmosphere of 20° C. and 50% RH.

4) Viscosity

The viscosity was measured at a shear rate of 1,400 $s^{-1}$ in an atmosphere of 20° C. and 50% RH.

5) Continuous emission test (scorching over the head, heater fault)

The ink was measured for emission during $1 \times 10^7$ pulse and $1 \times 10^8$ pulse continuous emission by means of a thermal ink jet printer produced for evaluation. The emission change from the initial value and blank area and disturbance in the printed image were evaluated according to the following criterion:

G ... Emission change: less than ±10%; no image blank area and disturbance

F ... Emission change: ±10% to less than ±20%; image defects such as image blank area and disturbance: less than 5%

P ... Emission change: not less than ±20%; image defects such as image blank area and disturbance: not less than 5%.

In addition to the foregoing properties, the occurrence of heater fault (under $1 \times 10^6$ pulse) was observed.

6) Clogging property test

An ink which had been stored in an acceleration mode (70° C. and 500 hours) was emitted through an ink jet printer produced for evaluation. After the emission was suspended, the ink jet printer was allowed to stand for 1 week with the nozzle capped. The emission was then resumed. The printed image was observed for disturbance. The results were evaluated according to the following criterion:

G ... No image blank area and disturbance

F ... Image defects such as blank area and disturbance: less than 5%

P ... Image defects such as blank area and disturbance: not less than 5%.

The results are set forth in Table 2.

TABLE 2

| Test | | Example 1 | Comparative Example 1 | Comparative Example 2 | Example 2 | Example 3 | Comparative Example 3 |
|---|---|---|---|---|---|---|---|
| 1) | Initial pH | 7.0 | 6.3 | 6.4 | 7.0 | 7.8 | 7.1 |
| 2) | pH after storage at ordinary temperature | 7.0 | 5.6 | 5.5 | 7.0 | 7.8 | 7.0 |
| | pH change | 0 | −0.7 | −0.9 | 0 | 0 | −0.1 |
| 5) | $1 \times 10^7$ pulse continuous emission test | G | G | G | G | G | G |
| | $1 \times 10^8$ pulse continuous emission test | G | P | F | G | G | P |
| | Heater fault | G | G | G | G | G | P |
| 6) | Clogging property test | G | F | P | G | G | F |

Table 2 shows that Examples 1, 2 and 3 provide excellent results while the comparative examples had problems such as kogation, heater fault and clogging.

EXAMPLE 4

| C. I. acid blue 9 | 3 parts by weight |
| --- | --- |
| Glycerin | 20 parts by weight |
| Compound No. 1 as set forth in Table 1 | 0.1 part by weight |
| Hydrochloric acid | 0.01 part by weight |
| Pure water | 80 parts by weight |

These components were mixed to make a solution which was then filtered in the same manner as in Example 1 to prepare an ink. The ink thus prepared exhibited a viscosity of 2.2 cP, a surface tension of 56 dyn/cm, an initial pH value of 6.9, and a pH value of 6.8 after storage. For the continuous emission and clogging property tests, the ink was evaluated good (G).

EXAMPLE 5

| C. I. acid red 249 | 3 parts by weight |
| --- | --- |
| Diethylene glycol | 15 parts by weight |
| HO(C$_2$H$_4$O)$_a$(C$_3$H$_6$)$_b$(C$_2$H$_4$O)$_c$H (oxypropylene block molecular weight: 1,800; oxyethylene content: 20%; average molecular weight: about 2,250) | 0.5 part by weight |
| Diethylene glycol monobutyle ether | 10 parts by weight |
| Compound No. 3 as set forth in Table 1 | 0.1 part by weight |
| Pure water | 70 parts by weight |

These components were mixed to make a solution which was then filtered in the same manner as in Example 1 to prepare an ink. The ink thus prepared exhibited a viscosity of 2.8 cP, a surface tension of 36 dyn/cm, an initial pH value of 7.8, and a pH value of 7.7 after storage. For the continuous emission and clogging property tests, the ink was evaluated good (G).

EXAMPLE 6

| C. I. food black 2 | 4 parts by weight |
| --- | --- |
| Triethylene glycol | 20 parts by weight |
| Compound No. 3 as set forth in Table 1 | 0.7 part by weight |
| Pure water | 75 parts by weight |

These components were mixed to make a solution which was then filtered in the same manner as in Example 1 to prepare an ink. The ink thus prepared exhibited a viscosity of 2.2 cP, a surface tension of 49 dyn/cm, an initial pH value of 8.0, and a pH value of 7.9 after storage. For the continuous emission and clogging property tests, the ink was evaluated good (G).

EXAMPLE 7

| C. I. direct black 19 | 4 parts by weight |
| --- | --- |
| Diethylene glycol | 20 parts |
| Isopropyl alcohol | 5 parts by weight |
| Compound No. 3 as set forth in Table 1 | 0.1 part by weight |
| Nitric acid | 0.02 part by weight |
| Pure water | 75 parts by weight |

These components were mixed to make a solution which was then filtered in the same manner as in Example 1 to prepare an ink. The ink thus prepared exhibited a viscosity of 2.8 cP, a surface tension of 44 dyn/cm, an initial pH value of 6.7, and a pH value of 6.6 after storage. For the continuous emission and clogging property tests, the ink was evaluated good (G).

EXAMPLE 8

| C. I. direct blue 199 | 3 parts by weight |
| --- | --- |
| Glycerin | 10 parts by weight |
| Sulforan | 2 parts by weight |
| Compound No. 2 as set forth in Table 1 | 0.05 part by weight |
| Hydrochloric acid | 0.03 part by weight |
| Pure water | 85 parts by weight |

These components were mixed to make a solution which was then filtered in the same manner as in Example 1 to prepare an ink. The ink thus prepared exhibited a viscosity of 1.7 cP, a surface tension of 55 dyn/cm, an initial pH value of 4.9, and a pH value of 4.5 after storage. For the continuous emission test, the ink was evaluated good (G). For the clogging property test, the ink was evaluated fair (F).

EXAMPLE 9

| C. I. direct black 168 | 3 parts by weight |
| --- | --- |
| Propylene glycol | 20 parts by weight |
| HO(C$_2$H$_4$O)$_a$(C$_3$H$_6$)$_b$(C$_2$H$_4$O)$_c$H (oxypropylene block molecular weight: 1,800; oxyethylene content: 40%; average molecular weight: about 3,000) | 1 part by weight |
| Compound No. 2 as set forth in Table 1 | 0.1 part by weight |
| Hydrochloric acid | 0.01 part by weight |
| Pure water | 75 parts by weight |

These components were mixed to make a solution which was then filtered in the same manner as in Example 1 to prepare an ink. The ink thus prepared exhibited a viscosity of 2.0 cP, a surface tension of 36 dyn/cm, an initial pH value of 7.0, and a pH value of 7.2 after storage. For the continuous emission and clogging property tests, the ink was evaluated good (G).

EXAMPLE 10

| C. I. direct blue 86 | 3 parts |
| --- | --- |

-continued

| | |
|---|---|
| Diethylene glycol | 15 parts by weight |
| Compound No. 2 as set forth in Table 1 | 0.6 part by weight |
| Acetic acid | 0.06 part by weight |
| Pure water | 85 parts by weight |

These components were mixed to make a solution which was then filtered in the same manner as in Example 1 to prepare an ink. The ink thus prepared exhibited a viscosity of 1.9 cP, a surface tension of 52 dyn/cm, an initial pH value of 7.2, and a pH value of 7.1 after storage. For the continuous emission and clogging property tests, the ink was evaluated good (G).

EXAMPLE 11

| | |
|---|---|
| C. I. direct yellow 144 | 2 parts by weight |
| Propylene glycol | 15 parts by weight |
| Compound No. 3 as set forth in Table 1 | 1.5 part by weight |
| Pure water | 80 parts by weight |

These components were mixed to make a solution which was then filtered in the same manner as in Example 1 to prepare an ink. The ink thus prepared exhibited a viscosity of 2.0 cP, a surface tension of 44 dyn/cm, an initial pH value of 8.5, and a pH value of 8.6 after storage. For the continuous emission and clogging property tests, the ink was evaluated good (G).

EXAMPLE 12

| | |
|---|---|
| Carbon black | 3 parts by weight |
| Ethylene glycol | 15 parts by weight |
| Styrene-sodium acrylate copolymer | 1 part by weight |
| $HO(C_2H_4O)_a(C_3H_6)_b(C_2H_4O)_cH$ (oxypropylene block molecular weight: 1,800; oxyethylene content: 50%; average molecular weight: about 3,600) | 1 part by weight |
| Compound No. 1 as set forth in Table 1 | 0.1 part by weight |
| Pure water | 80 parts by weight |

These components were mixed to make a solution which was then filtered in the same manner as in Example 1 to prepare an ink. The ink thus prepared exhibited a viscosity of 2.2 cP, a surface tension of 42 dyn/cm, an initial pH value of 6.7, and a pH value of 6.6 after storage. For the continuous emission and clogging property tests, the ink was evaluated good (G).

The ink for thermal ink jet recording according to the present invention comprises water and a coloring material as essential components and further contains a polyolamine containing three hydroxyl groups in one alkyl side chain. Thus, the ink according to the present invention minimizes kogation and exhibits a high coloring material dissolution stability. Further, the ink according to the present invention causes no deterioration of the head material, head clogging and emission unevenness. Moreover, the ink according to the present invention exhibits a small pH change.

While the invention has been described in detail and with reference to specific embodiments thereof, it will be apparent to one skilled in the art that various changes and modifications can be made therein without departing from the spirit and scope thereof.

What is claimed is:

1. An ink for thermal ink jet recording comprising water, a coloring material and an amino compound represented by formula (I) or (II):

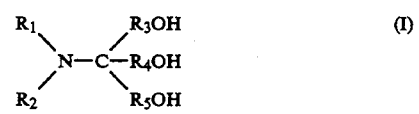

(I)

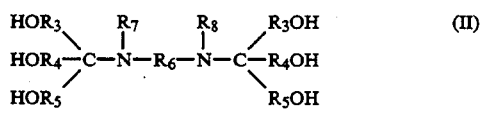

(II)

wherein $R_1$ represents a $C_{1-5}$ alkyl group having a hydroxyl group; $R_2$, $R_7$ and $R_8$ may be the same or different and each represents a hydrogen atom or a $C_{1-5}$ alkyl group having a hydroxyl group; $R_3$, $R_4$ and $R_5$ may be the same or different and each represents a $C_{1-3}$ alkylene group; and $R_6$ represents a $C_{1-5}$ alkylene group.

2. The ink for thermal ink jet recording according to claim 1, wherein said amino compound is selected from the group consisting of:

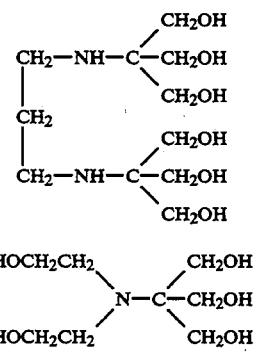

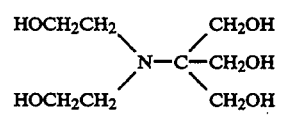

and

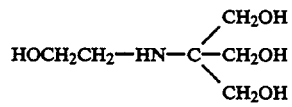

3. The ink for thermal ink jet recording according to claim 1, wherein the content of said amino compound is in the range of 0.005 to 5.0% by weight based on the total weight of said ink.

4. The ink for thermal ink jet recording according to claim 1, wherein the content of said amino compound is in the range of 0.01 to 3.0% by weight based on the total weight of said ink.

* * * * *